US012579819B2

(12) United States Patent
Holicki

(10) Patent No.: US 12,579,819 B2
(45) Date of Patent: Mar. 17, 2026

(54) METHOD AND PROCESSOR CIRCUIT FOR LOCALIZING A MOTOR VEHICLE IN AN ENVIRONMENT DURING A DRIVING OPERATION AND ACCORDINGLY EQUIPPED MOTOR VEHICLE

(71) Applicant: CARIAD SE, Wolfsburg (DE)

(72) Inventor: Michael Holicki, Berlin (DE)

(73) Assignee: CARIAD SE, Wolfsburg (DE)

( * ) Notice: Subject to any disclaimer, the term of this patent is extended or adjusted under 35 U.S.C. 154(b) by 475 days.

(21) Appl. No.: 18/160,236

(22) Filed: Jan. 26, 2023

(65) Prior Publication Data

US 2023/0245469 A1 Aug. 3, 2023

(30) Foreign Application Priority Data

Feb. 3, 2022 (DE) .................... 10 2022 102 567.5

(51) Int. Cl.
*G06V 20/58* (2022.01)
*B60W 30/095* (2012.01)
*G06T 7/73* (2017.01)

(52) U.S. Cl.
CPC ......... *G06V 20/58* (2022.01); *B60W 30/0956* (2013.01); *G06T 7/73* (2017.01); *B60W 2420/403* (2013.01)

(58) Field of Classification Search
None
See application file for complete search history.

(56) References Cited

U.S. PATENT DOCUMENTS

2009/0299494 A1* 12/2009 Kahn ..................... G05B 13/04
702/179
2021/0024081 A1* 1/2021 Johnson-Roberson .....................
G01S 17/89
(Continued)

FOREIGN PATENT DOCUMENTS

DE 102016214028 A1 2/2018
DE 102019216722 A1 5/2021
(Continued)

OTHER PUBLICATIONS

Engel et al., "DeepLocalization: landmark-based self-localization with deep neural 1 networks," IEEE Intelligent Transporation Systems Conference, Auckland, New Zealand, 2019, arXiv:1904.09007.

(Continued)

*Primary Examiner* — Delomia L Gilliard
(74) *Attorney, Agent, or Firm* — Seed Intellectual Property Law Group LLP

(57) ABSTRACT

A method for localizing a motor vehicle in an environment during a driving operation comprises, by a processor circuit in repeated estimation cycles, receiving sensor data of landmarks of the environment from an environment sensor, and ascertaining a respective estimated position of the motor vehicle from feature data, which are formed of map data of a map region of the environment and of the sensor data, using an estimation module. A movement path is estimated from the positions of multiple of the estimation cycles using a statistical observer model, and the observer model, during the formation of the movement path, models measurement noise contained in the position data as a covariance matrix of position coordinates of the position data, with matrix values of the covariance matrix being ascertained by the (Continued)

estimation module as a function of the sensor data and the map data.

13 Claims, 8 Drawing Sheets

(56)                    References Cited

U.S. PATENT DOCUMENTS

| | | | |
|---|---|---|---|
| 2021/0101616 A1 | 4/2021 | Hayat et al. | |
| 2021/0182596 A1 | 6/2021 | Adams et al. | |
| 2022/0066456 A1* | 3/2022 | Ebrahimi Afrouzi | ........................ G06F 3/04883 |
| 2022/0146264 A1* | 5/2022 | Brommer | ........... G01C 21/1656 |
| 2023/0078721 A1* | 3/2023 | Wang | ................. G01C 21/3476 701/533 |
| 2023/0129620 A1* | 4/2023 | Kolagheichi-Ganjineh | ................ G06V 20/582 382/103 |
| 2023/0147535 A1* | 5/2023 | Terazawa | ............... G01C 21/30 |
| 2023/0245469 A1* | 8/2023 | Holicki | ............ B60W 30/0956 382/103 |
| 2023/0366698 A1* | 11/2023 | Nister | ................ G01C 21/3815 |
| 2024/0092397 A1* | 3/2024 | Carter | .............. B60W 50/0097 |

FOREIGN PATENT DOCUMENTS

| | | | | |
|---|---|---|---|---|
| WO | WO 2018104563 A2 | 6/2018 | | |
| WO | WO-2020002261 A1 * | 1/2020 | ............. | G01C 21/30 |
| WO | WO-2024099593 A1 * | 5/2024 | .............. | G06T 7/73 |

OTHER PUBLICATIONS

Liu et al., "Deep inference for covariance estimation: learning gaussian noise models for 2 state estimation", IEEE International Conference on Robotics and Automation (ICRA), Brisbane, Austrailia, May 21-25, 2018, pp. 1436-1443.

Xiao et al., "Monocular vehicle self-localization method based on compact semantic map," 2018 21st International Conference on Intelligent Transportation Systems (ITSC), Maui, Hawaii, USA, Nov. 4-7, 2018.

Ze et al., "Research on path planning and simulation of intelligent logistics vehicle based on improved EKF-SALM algorith," 2020 5th International Conference on Mechanical, Control and Computer Engineering (ICMCCE), 2020, pp. 1684-1687, doi: 10.1109/ICMCC51767.2020.00369.

Wei et al., "Learning to Localize Through Compressed Binary Maps," arXiv:2012.10942v1 [cs.CV], Dec. 20, 2020. (18 pages).

* cited by examiner

METHOD AND PROCESSOR CIRCUIT FOR LOCALIZING A MOTOR VEHICLE IN AN ENVIRONMENT DURING A DRIVING OPERATION AND ACCORDINGLY EQUIPPED MOTOR VEHICLE

BACKGROUND

Technical Field

Embodiments of the invention relate to a method and to a processor circuit for determining the position of or for localizing a motor vehicle in an environment during a driving operation. Embodiments of the invention also relate to a motor vehicle that is equipped with a corresponding processor circuit.

Description of the Related Art

A method of the aforementioned type is known from a scientific publication by Engel et al, according to which relative positions of landmarks, as ascertained based on LIDAR data, are matched with map data (Nico Engel, Stefan Hoermann, Markus Horn, Vasileios Belagiannis and Klaus Dietmayer, "Deep Localization: Landmark-based Self-Localization with Deep Neural Networks", IEEE Intelligent Transportation Systems Conference (ITSC 2019), Auckland, New Zealand, arXiv:1904.09007). So as to compensate for estimation variances occurring in the process, a Kalman filter is arranged downstream from the actual position estimation, which generates a progression of the position estimation that is consistent over time.

However, the known method requires three-dimensional point coordinates of landmarks of the environment, which can only be ascertained by means of three-dimensionally measuring environment sensors, for example a LIDAR. It is not possible to use a monocular camera for this method since, in particular, depth information or spacing information would be lacking.

From a scientific publication by Xia et al. (Zhongyang Xiao, Kun Jiang, Shichao Xie, Tuopu Wen, Chunlei Yu, Diange Yang, "Monocular Vehicle Self-localization method based on Compact Semantic Map", 2018 21st International Conference on Intelligent Transportation Systems (ITSC) Maui, Hi., USA, Nov. 4-7, 2018), self-localization based on image data of a monocular camera is known. Landmarks recognizable in the environment are extracted from the image data by way of object recognition using an artificial neural network, and a vehicle pose is estimated by means of a map-to-image registration. An estimation of the vehicle position in the longitudinal direction can have a comparatively large variance.

A localization method for a motor vehicle is known from WO 2018/104563 A1, which generates recognition features that are extracted from image data of a stereo camera and compared to corresponding map data of a high-definition (HD) road map so as to ascertain a map position of the motor vehicle. Landmarks, such as road signs and road markings, are no longer represented in the recognition features and the HD road map as images, but as points and polygon lines having assigned semantic labels.

Estimating the position of a motor vehicle based on individual images from a camera may cause an implausible switch in position or an implausible sudden change in position to be output for two consecutive camera images as a result of a variance or measurement noise. The described publication by Engel et al. compensates for this by way of a Kalman filter, which, however, initially has to estimate the measurement noise, which may cause the jumps in the position estimation, across multiple individual images or frames of the camera using recursive average. This can result in delays in the compensation for the measurement noise, in particular if the driving scene changes.

BRIEF SUMMARY

Some embodiments provide a method and a processor circuit for determining the position of or for localizing a motor vehicle in an environment during a driving operation. The processor circuit receives sensor data of landmarks of the environment from an environment sensor in repeated estimation cycles in order to compare the data to charted landmarks. For this purpose, feature data are formed of map data of a map region of the environment and of the sensor data, and position data of a particular position that the motor vehicle has with respect to the environment are estimated therefrom by means of an estimation module. Some embodiments provide a motor vehicle that is equipped with a corresponding processor circuit.

Some embodiments consistently estimate a sequence of movements or a movement path of a motor vehicle during a driving operation from estimated individual positions.

Some embodiments provide a method for localizing a motor vehicle in an environment during a driving operation. Estimation cycles are repeatedly carried out by a processor circuit to estimate in each case a current position of the motor vehicle. In the respective estimation cycle, sensor data of landmarks of the environment are received from an environment sensor, and then from feature data, which are formed of map data of a map region of the environment and of the sensor data, position data of a respective estimated position that the motor vehicle has with respect to an environment are then ascertained by means of an estimation module. The sensor data are in particular camera images or a sequence of individual camera images (so-called frames), for which in each case a position estimation may be carried out by means of the estimation module for generating respective position data. For example, geocoordinates of the earth and/or coordinates with respect to a coordinate system of the map data and/or coordinates in the sensor coordinate system may be estimated as position data.

The current position can be estimated in each estimation cycle based on an individual image or frame. So as to obtain a consistent succession or sequence of estimated positions across multiple individual images or frames, the approach of the previously described publication by Engel et al. is refined by estimating a movement path of the driving operation, that is, a succession of positions at different points in time, from the position data of several of the estimation cycles by means of a statistical observer model. The observer model can replicate movement kinematics of the motor vehicle, for example based on the so-called single track model. During the formation of the movement path, measurement noise present in the position data is modeled by a statistical observer model as a covariance matrix of position coordinates of the estimated position.

In some embodiments, these matrix values of the covariance matrix of the measurement noise are ascertained by the estimation module as a function of the sensor data and/or of the map data, and provided to the observer model. In other words, it is not necessary, as is customary in the prior art, to predefine the covariance matrix for the statistical observer model, that is, for example, a Kalman filter, based on an assumption about the measurement noise of the individual images or frames. Rather, the prior knowledge about the covariance of the measurement noise of the estimated position coordinates, as contained in the estimation module, is ascertained from the estimation module and transmitted to the statistical observer model, where the matrix values can then be entered or set in the covariance matrix of the measurement noise in the statistical observer model.

So as to clarify which covariance matrix of the measurement noise can be provided in this way in the case of an extended Kalman filter, the equations of the extended Kalman filter shall be provided here, as they are sufficiently known from the prior art.

Predicted state measurement: $\hat{x}_{k|k-1}=f(\hat{x}_{k-1|k-1},u_k)$

Predicted covariance matrix: $P_{k|k-1}=F_kP_{k-1|k-1}F_k^T+Q_k$

Update

Measurement residual: $\tilde{y}_k=z_k-h(\hat{x}_{k|k-1})$

Residual covariance: $S_k=H_kP_{k|k-1}H_k^T+R_k$

Kalman gain: $K_k=P_{k|k-1}H_k^TS_k^{-1}$

Updated state estimation: $\hat{x}_{k|k}=\hat{x}_{k|k-1}+K_k\tilde{y}_k$

Updated covariance: $P_{k|k}=(I-K_kH_k)P_{k|k-1}$

The variables provided here represent the variables sufficiently known from the prior art, k being the variable for the time steps.

The covariance matrix of the measurement noise provided from the estimation module is $R_k$ in this case. In the prior art, this is often defined as an estimated constant. The other computing steps of the Kalman filter can be adopted from the prior art.

Admittedly, the Kalman filter continues to be able to estimate the covariance matrix $P_{k|k}$ recursively across multiple individual images in the method (which is also the correct approach, since more information can be extracted from the image sequence than from the individual image and, accordingly, the covariances of the image sequence will be lower than those of the individual image). However, in contrast to the prior art (for example, according to the publication by Engel), in some embodiments the covariance of the individual image measurement required for this purpose (=measurement noise $R_k$) is not selected as a heuristically set constant matrix, but in the method introduced here is learned by the estimation module, and an individual covariance that is matched to the scene is ascertained from each individual image.

This solution is based on the realization that, in an estimation module, it is already possible to recognize the covariance of the position coordinates that will result or is to be expected in the estimation module based on the map data and/or based on the sensor data. If it can be recognized, for example, based on the map data and/or sensor data that only roadway markings extending in the longitudinal direction of the driving direction are detectable, it can already be signaled during the estimation of the position coordinate for the longitudinal direction (here, the x coordinate) by the estimation module that the position coordinate of the longitudinal direction can have a large variance or dispersion. The reason is that, without further landmarks enabling orientation or fixation relative to the longitudinal direction, such as road signs, an estimation of the position of the motor vehicle in the longitudinal direction or driving direction is not unambiguously possible. This can be signaled to the observer model, so that the same ascertains estimated position coordinates for the longitudinal direction in this region of the environment by means of the internal movement model thereof, instead of using the current estimated position coordinates from the estimation module. The position estimation ascertained in the observer model (such as a Kalman filter) can, of course, be a fusion of the movement model and the individual image evaluations, wherein the covariance matrix represents the uncertainty of this combined estimation. In this regard, no switching will take place between the movement model and the estimation module, but the fused result will be used at all times. A high covariance of the individual image will cause this image to be weighted less in the movement model (for example, Kalman filter), and the previous measurements or the measurements of other sensors, such as global navigation satellite system (GNSS, for example global positioning system (GPS) or initial measurement system (INS)) to dominate. This is a characteristic of a Kalman filter and, accordingly, further interventions are not necessary in this embodiment.

In some embodiments, the statistical observer model does not first have to "stabilize" or adapt, by recursive means, to a new environment when it comes to the estimation of the measurement noise. Instead, it is possible for the estimation module to signal directly with each estimation of position coordinates how reliable or low-variance the estimated position coordinates in each case currently are. In this way, in the event of a change in the environment, the observer model can respond directly to this change and consistently estimate the movement path during the driving operation.

The estimation module and the observer model can, for example, each be implemented as software for the processor circuit. The processor circuit itself can be based, for example, on at least one microprocessor, as will be described in greater detail below. The estimated movement path of the driving operation can be used, for example, for a driver assistance system or automated vehicle guidance (longitudinal guidance and/or lateral guidance of the motor vehicle by a control unit thereof).

One further development comprises that the observer model comprises a Luenberger observer or a Kalman filter and is adapted so as to set or adjust the covariance matrix thereof of the measurement noise by means of the matrix values from the estimation module. In this way, the Kalman filter known from the prior art, and in particular an extended Kalman Filter (EKF), is modified or adapted such that the covariance matrix $R_k$ thereof of the measurement noise is adopted from the estimation module. The measurement noise is thus modeled by means of an adaptive $R_k$. As a result, the observer model becomes very responsive when it comes to a change in the environment, and thus a change of the measurement noise in the position data.

The estimation module itself can, for example, be based, in the manner described at the outset, on a model of machine learning, for example an artificial neural network, which carries out the position data in the manner described at the outset by "registering" or comparing relative positions or arrangement patterns of the detected landmarks to the position information from the map.

One further development comprises that a preprocessing module is connected upstream from the estimation module for this purpose, which generates, as feature data, on the one hand, detection-based landmark descriptors of the landmarks, which are formed of the sensor data, and, on the other hand, map-based landmark descriptors of the landmarks, which are formed of the map data. In other words, the process is not directly dependent on the image data of a camera (that is, raw data), but these image data or, generally speaking, such sensor data can be processed by means of the preprocessing module to the effect that a respective landmark descriptor can be provided for individual landmarks detected in the environment, which lists properties abstracted or extracted for a particular landmark. Such abstracted properties can be, for example: a relative position/ relative location and/or a color and/or semantic information (for example, the information that it is a traffic sign). This is also possible for other types of sensor data, such as radar data and/or ultrasound data.

Accordingly, a list of landmark descriptors (map-based landmark descriptors) can likewise be provided by way of the map data, the list indicating which landmarks are to be expected or charted in the currently selected map region of the environment. Each landmark can thus be represented by a detection-based landmark descriptor based on the sensor data and by a respective map-based landmark descriptor from the road map. This yields a respective point list of points or landmarks that were ascertained once in a detection-based manner and once in a map-based manner. By comparing or aligning ("registering") the detection-based landmark descriptors with the map-based landmark descriptors, it is possible to ascertain the position that the motor vehicle currently must be in or have relative to the map region. The use of landmark descriptors has the advantage that a landmark can be represented by a predetermined number of the dimension D of features or abstracted properties and, in this way, a number of features that is reliable for the position estimation can be selected or implemented in a robust manner.

Additional embodiments are described in this regard hereafter, which describe or utilize a corresponding selection of properties that can be utilized in a landmark descriptor.

One further development comprises that the preprocessing module provides position data of a relative position of the particular landmark with respect to the motor vehicle in the detection-based landmark descriptors. If the landmark is an elevated object (such as a road sign), the relative position of such a landmark arranged above a driving surface is ascertained by dropping a perpendicular on the driving surface for a virtual line of sight connecting this landmark and the environment sensor, thereby constructing a line or vertical projection on the driving surface. This line or vertical projection represents possible relative positions. This line would, theoretically, be infinitely long. As a result, a position interval of multiple relative positions is selected therefrom. By means of a plausibility criterion, those relative positions are identified for this purpose for which a depiction size of the landmark results in the environment sensor which corresponds to the actually observed depiction size. This also allows a relative position on the driving plane or ground plane or the driving surface to be assigned to those landmarks which are situated above the driving surface, and in particular more than 50 centimeters above the driving surface. Examples of such landmarks are traffic lights, traffic signs, advertisements or bridges, just to name some examples. The geometry or position can nonetheless be coded relative to the driving surface. In addition, it may be advantageously taken into consideration in the process that the position relative to the distance from the motor vehicle may be ambiguous, which is expressed by the position interval, which describes several different distance values along the line. If, for example, a traffic sign is recognized, the absolute size value of which, for example the diameter of which, is unknown, it is possible to estimate a position interval from the depiction size on the environment sensor, for example an image sensor, such as a charge-couple device (CCD) sensor, when predetermined size values, for example a size of the landmark in the range of 30 cm to 2 m, is assumed or used as a basis for the traffic sign. At a given depiction size, only certain distance values can then result for the landmark. In the process, a currently set focal length of the environment sensor may be taken into consideration.

It is also possible for a roadway marking (line painted on the driving surface) to be coded as a position interval in a detection-based landmark descriptor, and also in a map-based landmark descriptor. In map data, such a roadway marking can be defined in any case as a polygon line, so that each polygon or line segment can be interpreted as a separate or independent landmark. In this way, each line segment can be described as a landmark that is situated on a driving surface and has two end points.

By means of semantic information or a semantic label, it is possible to indicate that a position interval is a landmark of a certain landmark type, for example a roadway marking or a segment thereof. Additional collateral information may be added as semantic data, for example as to whether it is a solid or a dashed roadway marking.

One further development comprises that the preprocessing module in each case integrates semantic label data (designation data) of a designation describing the landmark in terms of content into the detection-based and map-based landmark descriptors. In this way, it is possible, generally speaking, to use semantic label data for landmarks that specify a significance of the landmark or a function of the landmark, that is, a landmark type. Semantic label data can specify, by way of example, that a landmark is a speed limit or a traffic light or a driving direction arrow. It is also possible for more detailed information, for example "speed limit 50 km/h", to be specified. Semantic label data can be integrated into detection-based landmark descriptors since such semantic label data can be extracted or generated in the manner known per se in a preprocessing module, for example by means of object recognition or image recognition, from the sensor data of a camera.

One further development comprises that the preprocessing module integrates pixel data or filtered pixel data of image sections of the landmarks into the detection-based landmark descriptors. It thus may also be possible to integrate visual description data in a landmark descriptor, which can be used by an estimation module, for example, to resolve equivocalities, for example by distinguishing an orientation of a traffic sign, for example between a multi-color front side and a monochromatic rear side, solely based on the values of the pixels. This can be learned when training an estimation module, without action by an operator, for example when an orientation of a traffic sign in one direction (for example north) from the map data is associated or linked with a color value for gray when viewed from the opposite direction (viewing direction from the south). In this way, it is nonetheless possible to achieve a link between pixel values and information from map data, without explicitly or manually labeling or evaluating pixel data.

It may be advantageous in the process not to use raw pixel data, but a so-called feature map, which comes from another neural network. Such a feature map is the result of filtered pixel data. For this purpose, the image is processed using a convolutional neural network (CNN) as a filter, and the feature map is determined therefrom. When this upstream classifier for the semantic class of the traffic signs is already a neural network, such a feature map is even already incurred as a preliminary result here and does not have to be separately computed for the use of the filtered pixel data. The advantage of the feature map is that this generally supplies a more compact representation of the image section. All of this is described further below.

One further development comprises that the preprocessing module in each case integrates collateral semantic data of predetermined additional information, which is related to the landmark, into the detection-based and map-based landmark descriptors. Here, "collateral semantic data" refers to additional information that can be assigned to a landmark, such as the color or predominant color thereof (for example blue or white) and/or a configuration of a line, for example of a roadway marking (dashed or solid), and/or an alignment or orientation (for example of a traffic sign to the north or to the south), just to name examples. In particular, an estimation module can generate, in an automated manner, a meaningful or advantageous link from collateral semantic data of a road map in the described manner, such as, for example, the spatial orientation of a traffic sign, using pixel data from image sections of the sensor data.

One further development comprises that the estimation module comprises a model of machine learning, which is trained so as to compare or check the detection-based landmark descriptors to the map-based landmark descriptors for a position-related match, and generates or outputs correction coordinates for a maximized match as position data, wherein the correction coordinates describe a relative displacement of the landmarks represented by the detection-based landmark descriptors with respect to the map region. The correction coordinates could be delta values (for example, $\Delta x$, $\Delta y$, $\Delta z$, $\Delta \varphi$) for a correction with respect to a zero point of the map region relative to the longitudinal direction x, lateral direction y (relative to the driving direction or vehicle longitudinal direction or relative to the longitude and latitude) and height z and yaw angle or orientation angle $\varphi$ (also referred to as heading). The computation of the position-related match is also referred to as "registration." In combination with absolute geocoordinates of the map region, it is then possible to compute an absolute geocoordinate and/or an absolute orientation or alignment of the motor vehicle. The registration may take place by comparing the descriptors for the entire scene which are formed of all landmarks by means of max pooling, not by comparing the descriptors of the individual landmarks. This yields a network having a size that is independent of the number of landmarks, while dispensing with the process of locating correspondences between landmarks from the image and the map (which can be a step that is very prone to errors).

The publications described at the outset may be resorted to regarding algorithms for training the model of machine learning. In particular, an artificial neural network having at least one multilayer perceptron (MLP), as is described in the publication Google et al., can be used as a model. A video recording with the environment sensor can be used, for example, as training material for obtaining sensor data. A receiver of a position signal of a global navigation satellite system (GNSS) and/or an electronic compass, for example, can be resorted to as "labeling data" for the training, as is known for a training algorithm for a model of machine learning, so as to obtain target values or the so-called ground truth for the coordinates x, y and the heading $\varphi$. In particular, a differential GPS may be resorted to for the generation of the training maps so as to achieve sufficient spatial resolution or accuracy.

The model can be trained on the estimation of the covariance values by means of an estimation method, as described in the scientific publication by Liu et al. (Katherine Liu, Kyel Ok, William Vega-Brown, and Nicholas Roy, "Deep Inference for Covariance Estimation: Learning Gaussian Noise Models for State Estimation", 2018 IEEE International Conference on Robotics and Automation (ICRA), May 21-25, 2018, Brisbane, Australia). For example, var(x), var(y) and var(xy) for the estimated coordinates $\Delta x$, $\Delta y$ of the described correction coordinates may be ascertained as covariance values. It is also possible to estimate var($\varphi$), var($\varphi$ x), var($\varphi$ y).

One further development comprises that in each case at least one predetermined portion of the detection-based landmark descriptors and at least one predetermined portion of the map-based landmark descriptors are in each case processed or transformed by means of a multilayer perceptron (MLP), and thereafter the processed or transformed descriptors are summarized by means of a max pooling layer. It is important here that the descriptors are initially processed by the MLP before the max pooling takes place. In this way, the dimension of the feature vector is drastically increased (for example from 2 to 1024). This may be advantageous since, after the training, the MLP network is able to code the input descriptor such that a max pooling results in a representation of the entire scene. If, for example, a max pooling were only carried out for the original x and y coordinates of the landmark, the result would be a vector xmax, ymax with the maximum x and y coordinates of all landmarks, and all structural information would be lost. As a result of the upstream MLP, the information can be structured such that the max pooling results in a meaningful transformed descriptor across all landmarks.

The detection-based landmark descriptors among one another and/or the map-based landmark descriptors among one another are thus summarized by means of the max pooling method. For example, landmark descriptors can be configured as row vectors. It is then possible for those columns of the listed landmark descriptors which correspond to corresponding values to be summarized by means of the max pooling method, that is, the maximum value of the respective column from all selected or intended landmark descriptors to which the max pooling layer is to be applied is selected. From these multiple landmark descriptors, an individual landmark descriptor of the same dimensionality is thus generated which, as entries, in each case includes the maximum value entry in the landmark descriptor. In this way, it is possible to create a single representative landmark descriptor for all detector landmarks or landmarks selected in the map by way of a single summarized landmark descriptor. This simplifies the comparison of the sensor-based landmark descriptors to the map-based landmark descriptors. For example, those generated from the max pooling layer can be concatenated for the landmark descriptors (detection-based and map-based), and, by means of an artificial neural network, the described correction coordinates for the match as well as the previously described matrix values for the covariance matrix can be computed therefrom One further development comprises that the sensor data include a two-dimensional depiction of the environment and that, by means of object recognition, recognition data of objects recognized in the environment by way of the object recognition are ascertained from the sensor data, wherein the recognition data comprise semantic data of object designations of the objects and/or geometric data of a position and/or shape of the objects. In particular, a two-dimensional depiction is exclusively used, that is, the method does not utilize any measured depth information. In particular, a monocular camera image can be utilized as the two-dimensional depiction. In other words, the environment sensor is a monocular camera, such as may be provided in a motor vehicle, for example, for picking up the area of the road located ahead. It is possible, by means of object recognition or an object detector, to ascertain from the individual images or the image sequence of the camera with respect to individual objects whether a landmark of a predetermined type is involved (for example a road sign or a roadway marking). Other objects, such as mobile road users that do not represent landmarks, can thus be filtered out or be ignored. The objects that are identified in the recognition data as landmarks can, for example, be denoted by the semantic data (for example, traffic sign or traffic light or roadway marking). For example, the position in the two-dimensional depiction can be specified as geometric data, for example as a so-called bounding box coordinate in the two-dimensional depiction. In general, the coordinates u and v (to distinguish from x and y) are used as the coordinate system within a 2D depiction. A bounding box that frames the detected object can be provided as the shape, for example.

One further development comprises that the map data of the map region are selected from a digital environment map of the environment in a database by means of initial position data of at least one localization unit. In this way, it is possible to resort to a localization unit such as a GPS receiver and/or vehicle odometry for the selection of a map region or map section to be currently used. The map region can, for example, provide a rectangle having edge lengths in the range from 10 m to 200 m. GPS, as described here, can be used for initializing the method (the first selected map section). During ongoing operation, after the initialization has taken place, the prediction of the observer model (Kalman filter) may be resorted to. This has the advantage that the vehicle is thus also able to drive through areas without GPS coverage, such as tunnels, without the localization thereof being lost.

One further development comprises that the environment sensor is a monocular camera. As was already stated, it is thus possible to achieve a camera-based localization without sensor data with depth information or 3D information. This makes the implementation particularly cost-effective and technologically simple.

Some embodiments include a processor circuit. The processor circuit can be operated in a motor vehicle or in a back-end server of the motor vehicle, wherein the processor circuit is designed to carry out an embodiment of the method. The processor circuit can thus be provided in the motor vehicle itself or in a stationary server of the Internet, that is, a back-end server of the motor vehicle. The sensor data can be evaluated in the back-end server by being transmitted from the environment sensor of the motor vehicle via a communication link. This may be an Internet connection, for example, which can also comprise a radio link or radio connection, such as a wireless local area network (WLAN) and/or mobile radio communication, for example. The processor circuit can comprise at least one microprocessor and/or at least one microcontroller and/or at least one field-programmable gate array (FPGA) and/or at least one digital signal processor (DSP). The processor circuit can furthermore include program code, which is designed to carry out the embodiment of the method described herein when executed by the processor circuit. The program code can be stored in a data memory of the processor circuit.

Some embodiments include a motor vehicle comprising an environment sensor and an embodiment of the processor circuit coupled to the environment sensor, wherein the processor circuit is coupled to a control unit, which is designed for automated vehicle guidance, for transmitting an estimated movement path of a driving operation of the motor vehicle. The motor vehicle may be designed as a car, for example as a passenger car or a truck, or as a passenger bus or a motorcycle. In particular, the above-described monocular camera, and in particular only this monocular camera, can be provided as the environment sensor. The sensor data then represent a two-dimensional depiction in the form of a camera image, a sequence of which, that is a video, being able to depict or describe the progression of the driving operation.

Some embodiments include a computer-readable memory medium comprising commands that, when executed by a computer or a computer network, prompt this computer or this computer network to carry out an embodiment of the method described herein. The memory medium can be designed at least partially as a volatile data memory and/or at least partially designed as a non-volatile data memory. It can be one or more hard disks and/or flash memories and/or memory chips, just to name examples. The commands can be provided as so-called binary code or assembler code or compiled program code, which can be executed by the computer or computer network by means of a processor circuit of the described kind provided by this computer or computer network, or as source code.

Some embodiments include combinations of the features of the described embodiments. Some embodiments include the implementations that in each case include a combination of the features of multiple of the described embodiments, provided the embodiments were not described as being mutually exclusive.

DETAILED DESCRIPTION

Figure 1:
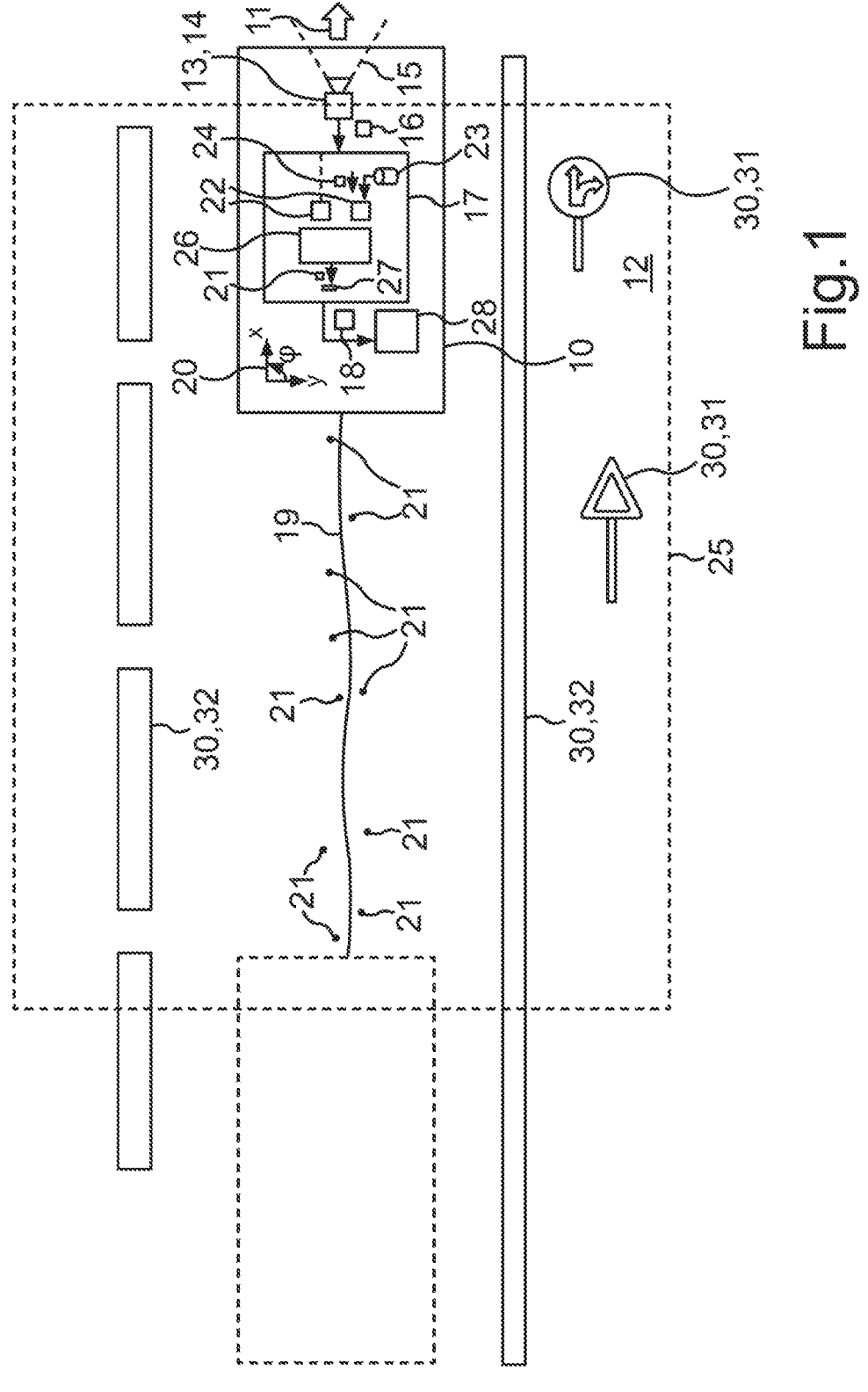
FIG. 1 shows a schematic illustration of an embodiment of a motor vehicle.

In the described embodiments, the described components of the embodiments in each case represent individual features which are to be considered independently of one another and which also can be used independently of one another. The disclosure shall therefore also encompass combinations of the features of the embodiments other than those shown. Furthermore, the described embodiments may also be supplemented with additional of the above-described features.

In the figures, identical reference numerals in each case denote functionally equivalent elements.

FIG. 1 shows a motor vehicle 10, which may be a car, and in particular a passenger car, or a truck from a bird's eye view. The motor vehicle 10 can be on a driving operation 11 through an environment 12. The environment 12 can be detected by at least one environment sensor 13 of the motor vehicle 10 during the driving operation 11. The environment sensor 13 can in particular be a monocular camera 14. The detection range 15 of the environment sensor 13 can, for example, be oriented in a forward driving direction at an area of the environment 12 ahead of the motor vehicle 10. Sensor data 16 can be generated by means of the environment sensor 13, which can be provided to a processor circuit 17 that is able to generate trajectory data 18 from the sensor data 16, which are able to describe an estimated movement trajectory or movement path 19 that the motor vehicle 10 has covered during the driving operation 11 thereof. The movement path 19 can be described with respect to a coordinate system 20, in which the coordinate x can be defined in the forward driving direction and the coordinate y can be defined transversely to the forward driving direction, and an angle for an orientation or a heading φ of the vehicle 10, for example, with respect to the north, can be specified. The movement path 19 can be estimated from individual estimated positions 21, which can in each case be formed into a two-dimensional depiction of the environment 12 or be estimated, that is, for example, formed into individual images or frames, such as can be received in the sensor data 16 from the environment sensor 13. The individual estimated positions 21 can be generated by comparing feature data 22, some of which can be formed of the sensor data 16 and some of which can be formed of a navigation database 23, of which map data 24 of a map region 25 of the environment 12 can be formed. These feature data can be compared for a match by means of an estimation module 26 to the effect that an arrangement of the feature data 22 of the maps from the map data 24 is aligned with the feature data 22 from the sensor data 16, from which the position 21 of the motor vehicle 10 can be inferred in the known manner. The chronological succession or the sequence of current positions 21 can be linked by means of an observer model 27 to form the movement path 19, which can then be provided by means of the trajectory data 18, for example, to an automated vehicle guidance system 28, which can be a driver assistance system, for example. As a result of the automated vehicle guidance system 28, the motor vehicle 10, during the driving operation 11 thereof, can be guided and/or steered in an automated manner relative to the longitudinal guidance (accelerating and/or decelerating) and/or lateral guidance (steering).

Landmarks 30, for example, can be described in each case by the feature data 22. A landmark 30 can in each case be a traffic sign 31 and/or a roadway marking 32, just to mention examples.

Figure 2:
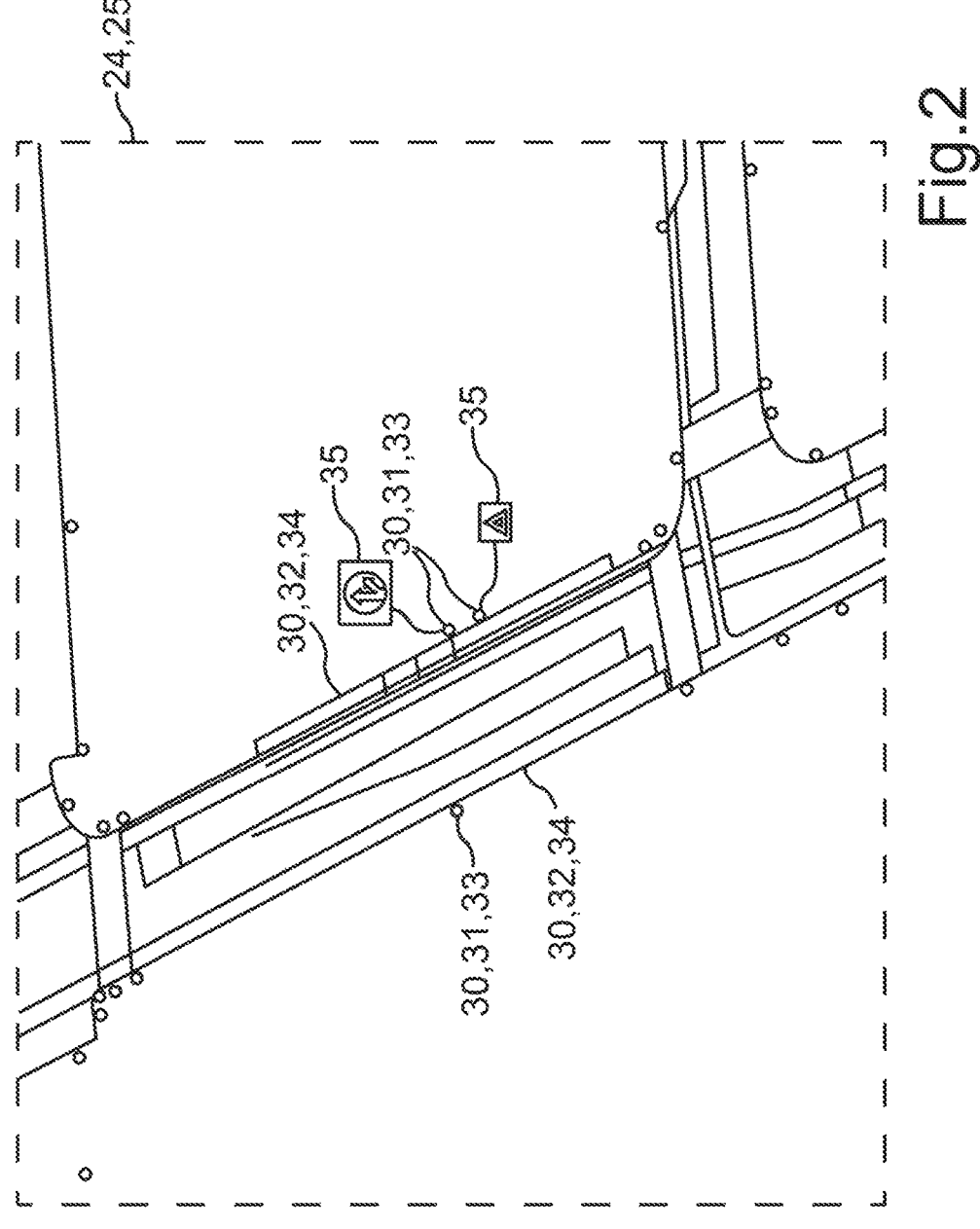
FIG. 2 shows a sketch of a map region.

FIG. 2 illustrates how the landmarks 30 in the map region 25 can be described by the map data 24 as extracted data elements, for example by defining points 33 and/or polygon lines 34. Such map data 24 are also referred to as a semantic map, which describe landmarks 30, on the one hand, by a geoposition of a point or of a starting point and an end point for roadway markings and, on the other hand, by semantic label data 35 describing the particular landmark 30.

Figure 3:
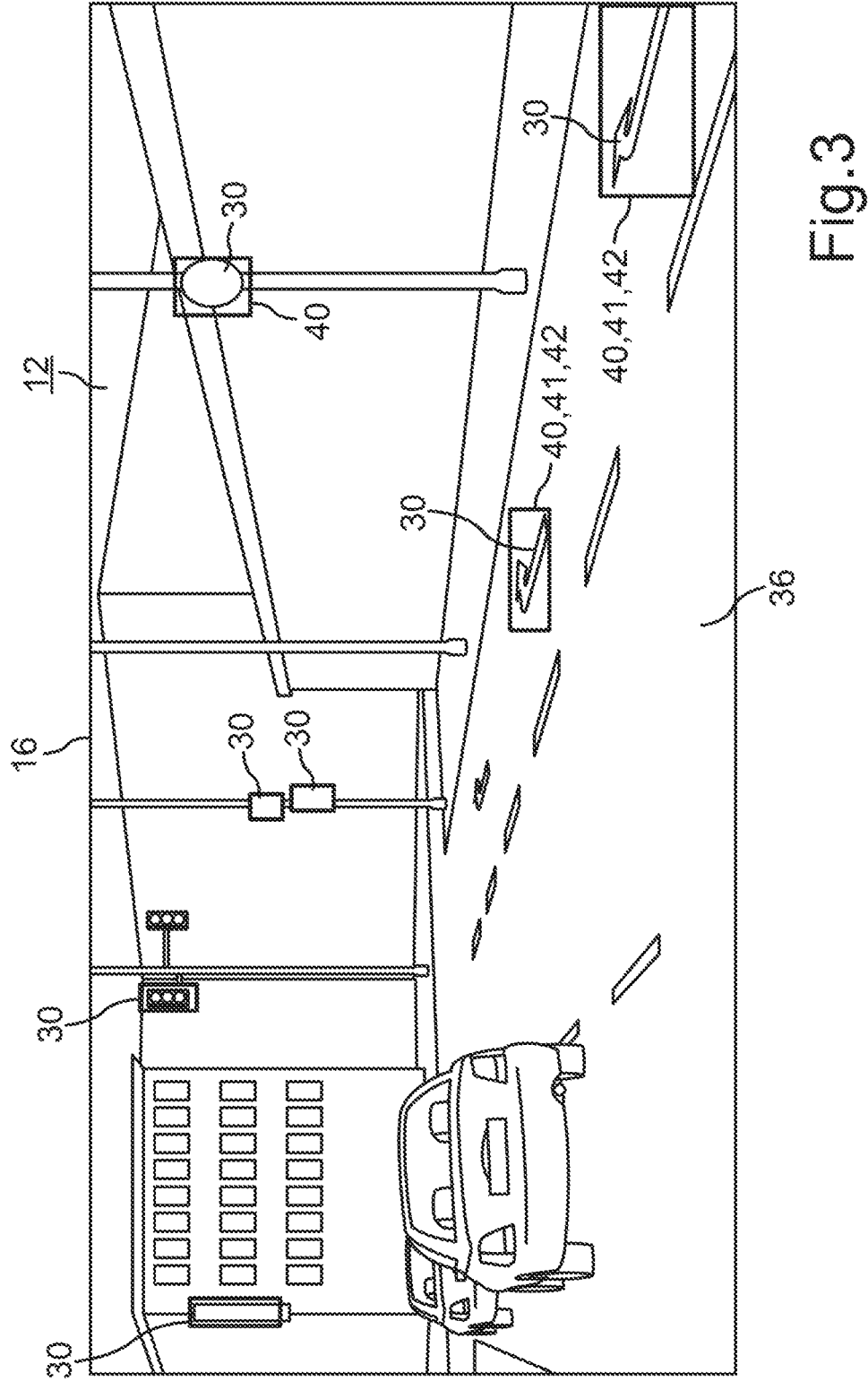
FIG. 3 shows a sketch to illustrate sensor data of a two-dimensional depiction from a monocular camera including recognition data illustrated therein from an object recognition in the form of bounding boxes placed around recognized landmarks.

FIG. 3 describes how, in contrast, the environment 12 can be represented by the sensor data 16 by a two-dimensional depiction in the form of pixel values 36 from a camera 14. In the sensor data 16 of the depiction, landmarks 30 can be marked by object recognition, such as is available per se in the prior art (feature detection) by means of detection data 40, which can define a bounding box 41, for example, around the particular landmark 30. Moreover, semantic information may be specified, describing what the landmark

30 according to the object recognition approximately is involved, that is, for example, a roadway marking or a traffic light or a traffic sign or an advertising sign, just to mention examples. It should be noted that, in a two-dimensional depiction (sensor data 16), a bounding box 41 delimits an image section that, in the described manner, can also yield pixel data 42 for the estimation module 26, as will be described hereafter.

Figure 4:
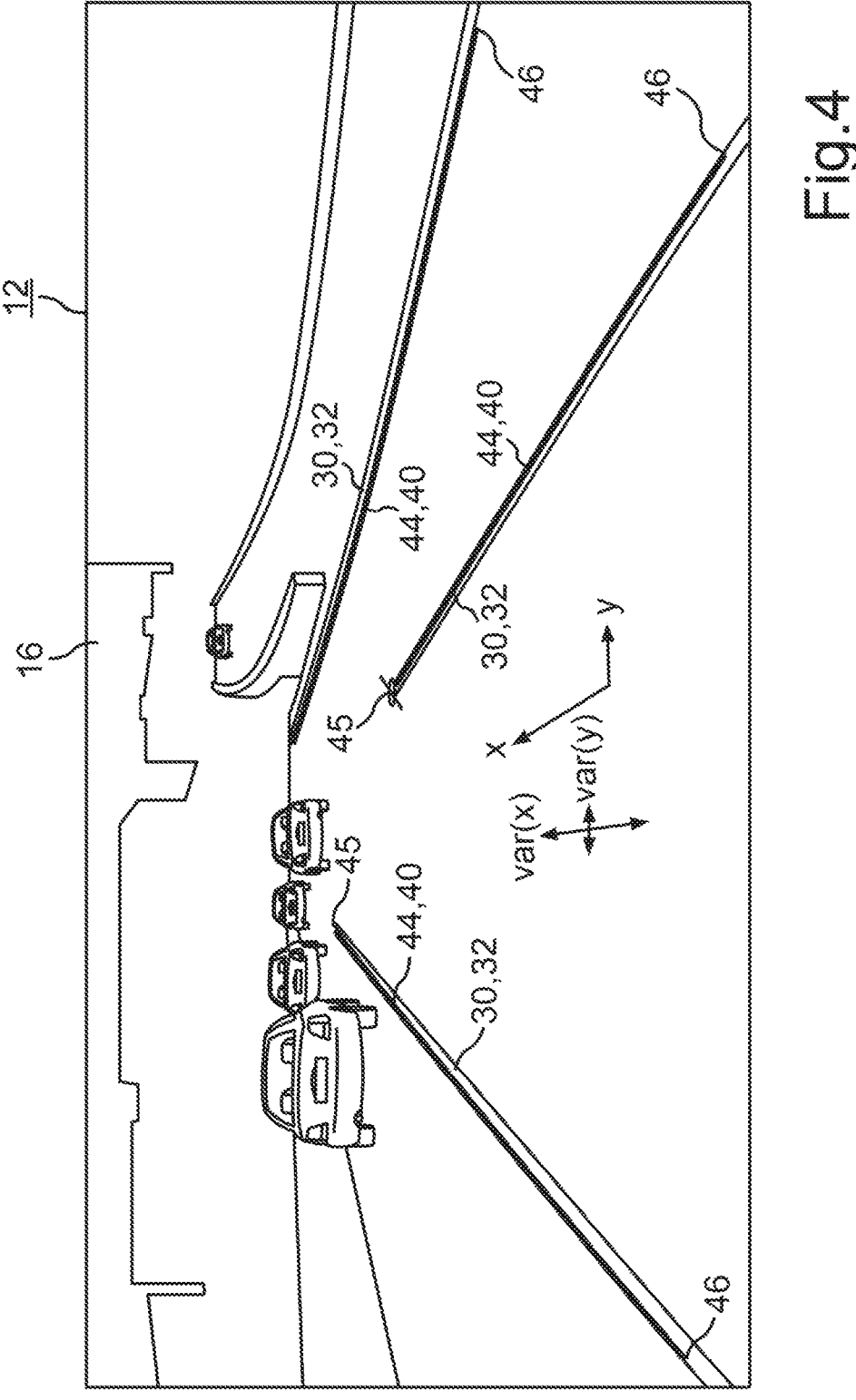
FIG. 4 shows another sketch to illustrate sensor data of a two-dimensional depiction with recognition data of roadway markings that are marked as a line segment of an object recognition.

FIG. 4 illustrates how, in a two-dimensional depiction (sensor data 16) of the environment 12, it is also possible for roadway markings 32 to be detected as landmarks 30 in the manner known per se by means of object recognition or feature detection and to be described by line segments 44 as recognition data 40.

An individual line segment 44 can be described by an end point 45 and a starting point 46. FIG. 4 illustrates that, as a result of a two-dimensional depiction (sensor data 16) in which exclusively such landmarks 30 extend homogeneously or uniformly in the longitudinal extension (along the coordinate x) in the form of roadway markings 32, the estimation module 26 can have a large dispersion or variance var (x) in the x direction (in the vehicle longitudinal direction), but a comparatively low variance var (y) in the vehicle transverse direction or y direction. This increase in the variance var (x) can be compensated for by the observer model 27 (see FIG. 1) in that the value var (x) is signaled by the estimation model 26 to the observer module 27 when such an environment situation is recognized, and the observer model 27 thereupon, in the manner known per se, generates an internal extrapolation of the x coordinate.

Figure 5:
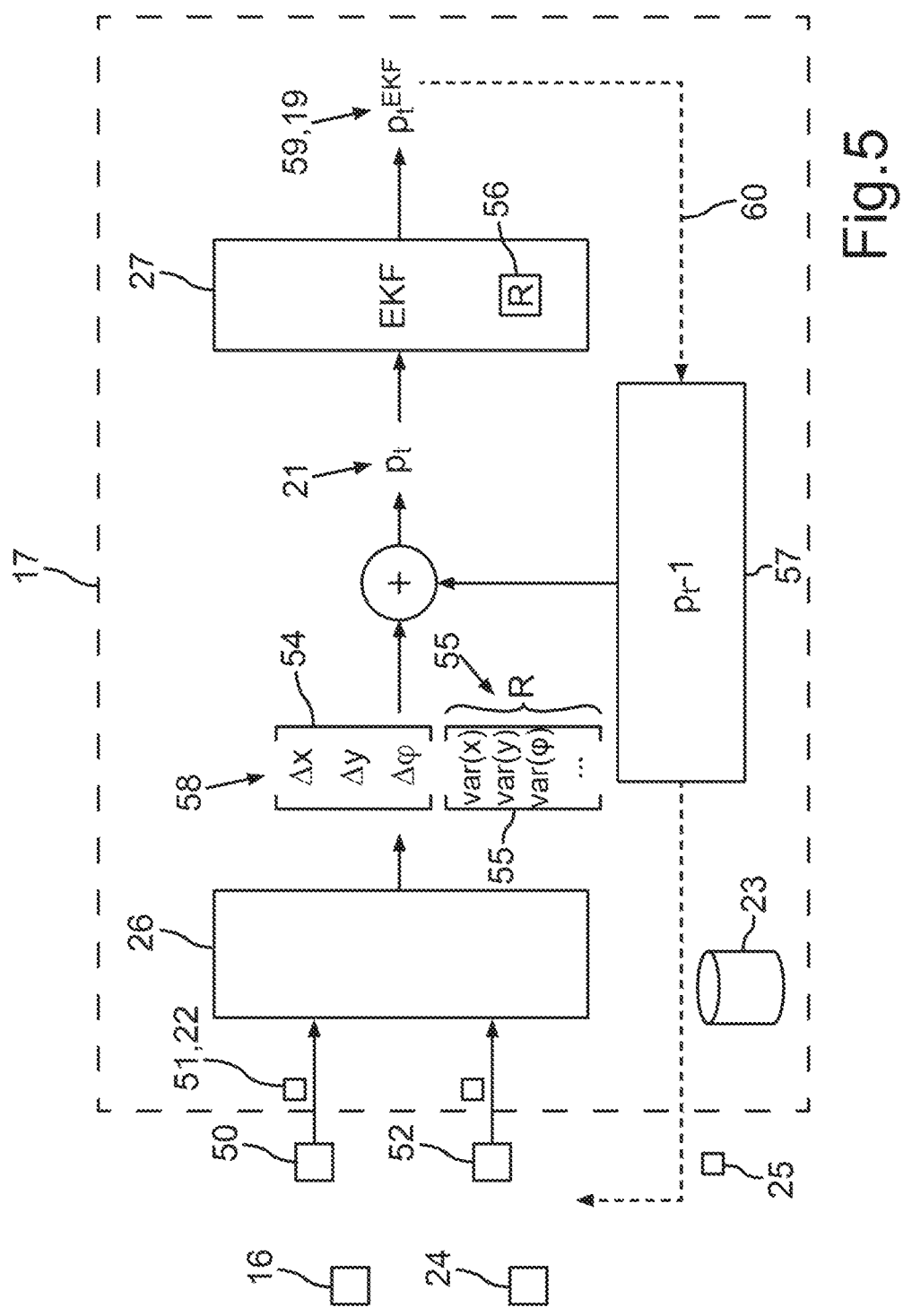
FIG. 5 shows a schematic illustration of a module and of an observer model.

FIG. 5 illustrates how the sensor data 16 can be received by a preprocessing module 50, which is able to ascertain detection-based landmark descriptors 51 from the sensor data 16, of which descriptors each can describe a recognized landmark 30 that was detected in the sensor data 16 by an objection recognition of the preprocessing module 50. Accordingly, map-based landmark descriptors 53 can be formed from the map data 24 by means of a preprocessing module 52, of which each can describe a landmark 30 as it is recorded in the map data 24.

As a result of the estimation module 26, the detection-based landmark descriptors 51 and the map-based landmark descriptors 53 can represent feature data 22 in the described manner, which are compared. It is then possible to output delta values 58 for updating the estimated position 21 as the estimation result. The estimated position data 54 for the position 21 can also contain matrix values 55 of a covariance matrix R, such as can be utilized by the observer model 27 for describing measurement noise 56.

The position 21 at a point in time t ($p_t$) can be computed from the preceding estimated position 57, $p_{t-1}$, and the delta values 58. This is known per se from the state of the art. The position 21 can be corrected by the observer model 27 at a path point 59 of the movement path 19 by taking the measurement noise 56 into consideration. For this purpose, the observer model 27 can be an extended Kalman filter (EKF), for example.

In the estimation cycle Z, the resulting updated position $p_t^{EKF}$ then represents the preceding estimation 57, $p_{t-1}$ for the next estimation cycle Z. From this, it is also possible to ascertain the map region 25 from the navigation database 23 by selecting corresponding map data 24 from the navigation database 23 as a function of the preceding estimation 57, $p_{t-1}$.

Figure 6:
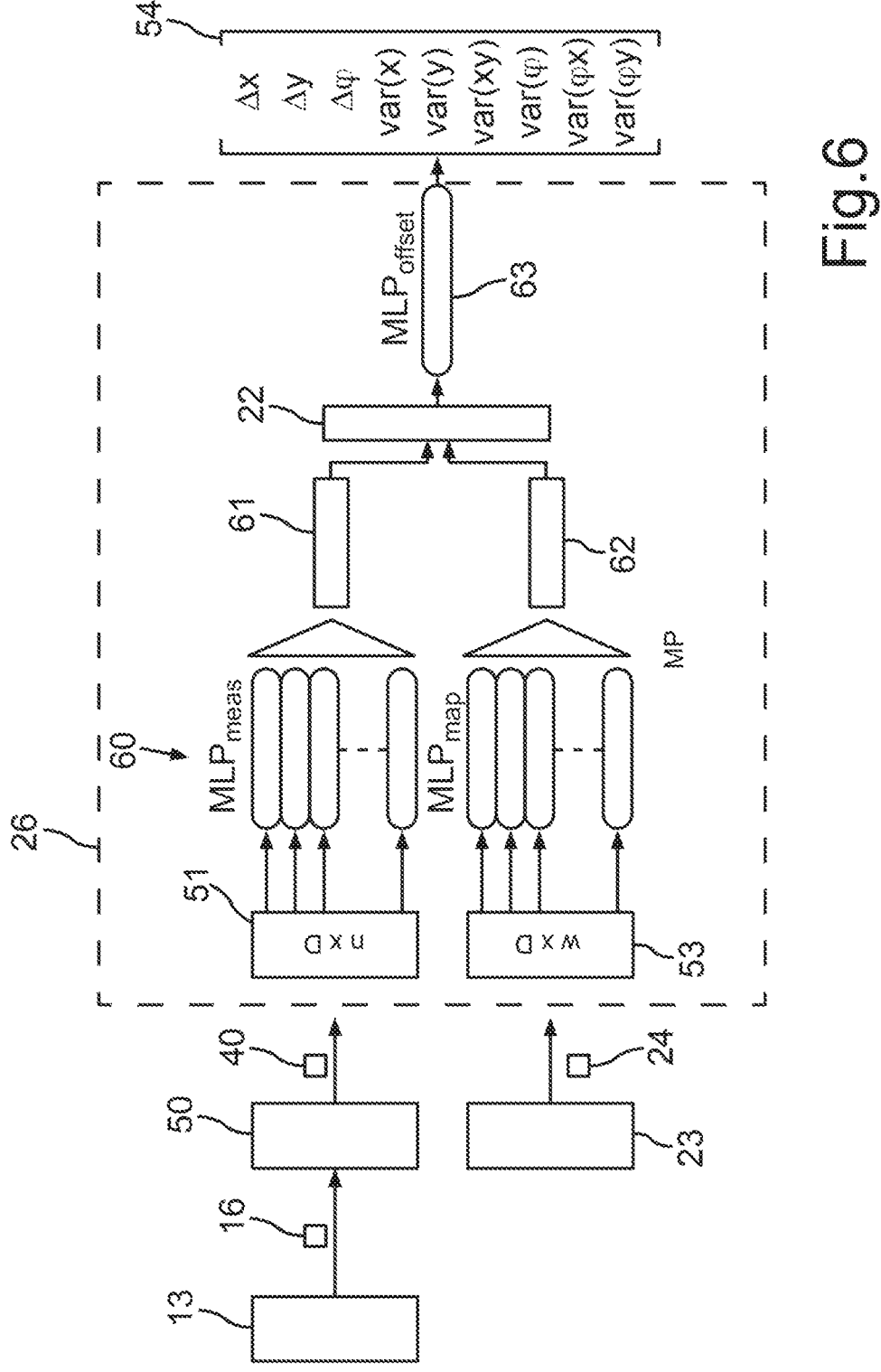
FIG. 6 shows a schematic illustration of the estimation module including an upstream preprocessing module.

FIG. 6 illustrates how the preprocessing module 50 can generate the recognition data 40 from the sensor data 16, which for each landmark 30 (see FIG. 3 and FIG. 4) can form a D-dimensional detection-based landmark descriptor 51. The detection-based landmark descriptors 51 can each be processed by means of an artificial neural network $MLP_{meas}$ (multi-layer perceptron) into processed or transformed descriptors.

Accordingly, a map-based landmark descriptor 53 can be generated by the preprocessing module 52 (FIG. 5) from the map data 24 of the navigation database 23 for each charted landmark 30, which can likewise be processed or transformed by means of an artificial neural network $MLP_{map}$. Here, it is shown how each landmark descriptor 51, 53 can be a D-dimensional vector, of which, for example, n detection-based landmark descriptors 51 and m map-based landmark descriptors 53 can be present. By means of max pooling MP, the respective lists 60 of the transformed landmark descriptors can be combined into an individual summarized landmark descriptor 61, 62 so that two row vectors are available as landmark descriptors 61 (detection-based) and 62 (map-based).

These can be summarized by means of a concatenation operation concat into a feature vector, which can represent the feature data 22. By means of a model 63 of machine learning, for example an artificial neural network $MLP_{offset}$, it is possible to ascertain therefrom the estimation result (position data 54) using the position estimation Δx, Δy, Δφ and the dispersion estimation or variance estimation of the matrix values var (x) to var (φy).

Figure 7:
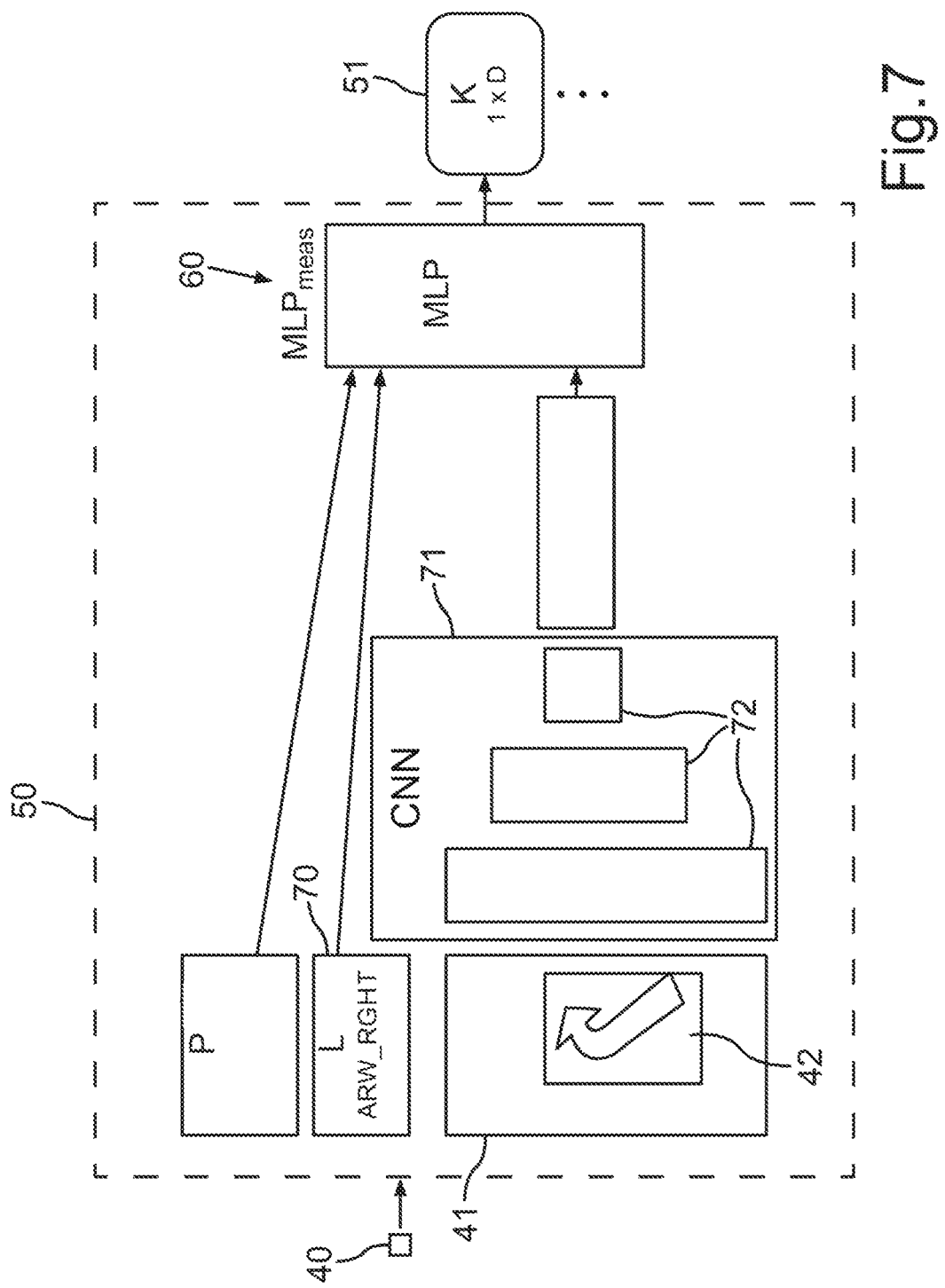
FIG. 7 shows a schematic representation of an embodiment of the preprocessing module for sensor data.

FIG. 7 illustrates an implementation of the preprocessing module 50. From the recognition data 40 of the feature detection or object detection, position data of a relative position P of the particular detected landmark 30 with respect to the motor vehicle in the environment 12 can be specified. Additionally or alternatively, semantic label data L can be provided, which can specify the recognized object or the object type as a label 70, for example for a turn arrow to the right ARW_RIGHT (arrow right), just to mention one example. Additionally or alternatively, pixel data 42 can be added as image information, which can be compressed or converted by means of a so-called encoder network 71, for example a convolutional neural network CNN having one or more convolutional layers 72 into a visual descriptor V.

In the described manner, a detection-based landmark descriptor K, 51, which can encompass the dimensionality or number D of feature values, for example, can be generated by means of the network $MLP_{meas}$ from the position data of the relative position P, the label data L and the visual descriptor V. This can also be carried out using the recognition data 40 of the further landmarks, as are illustrated by way of example in FIG. 3 and FIG. 4, for example, so as to generate the landmark descriptors 51 and, in a comparable manner, the map-based landmark descriptors 53. The reason is that the preprocessing module 52 can be designed in a comparable manner, wherein the processing of pixel data does not have to be provided.

Figure 8:
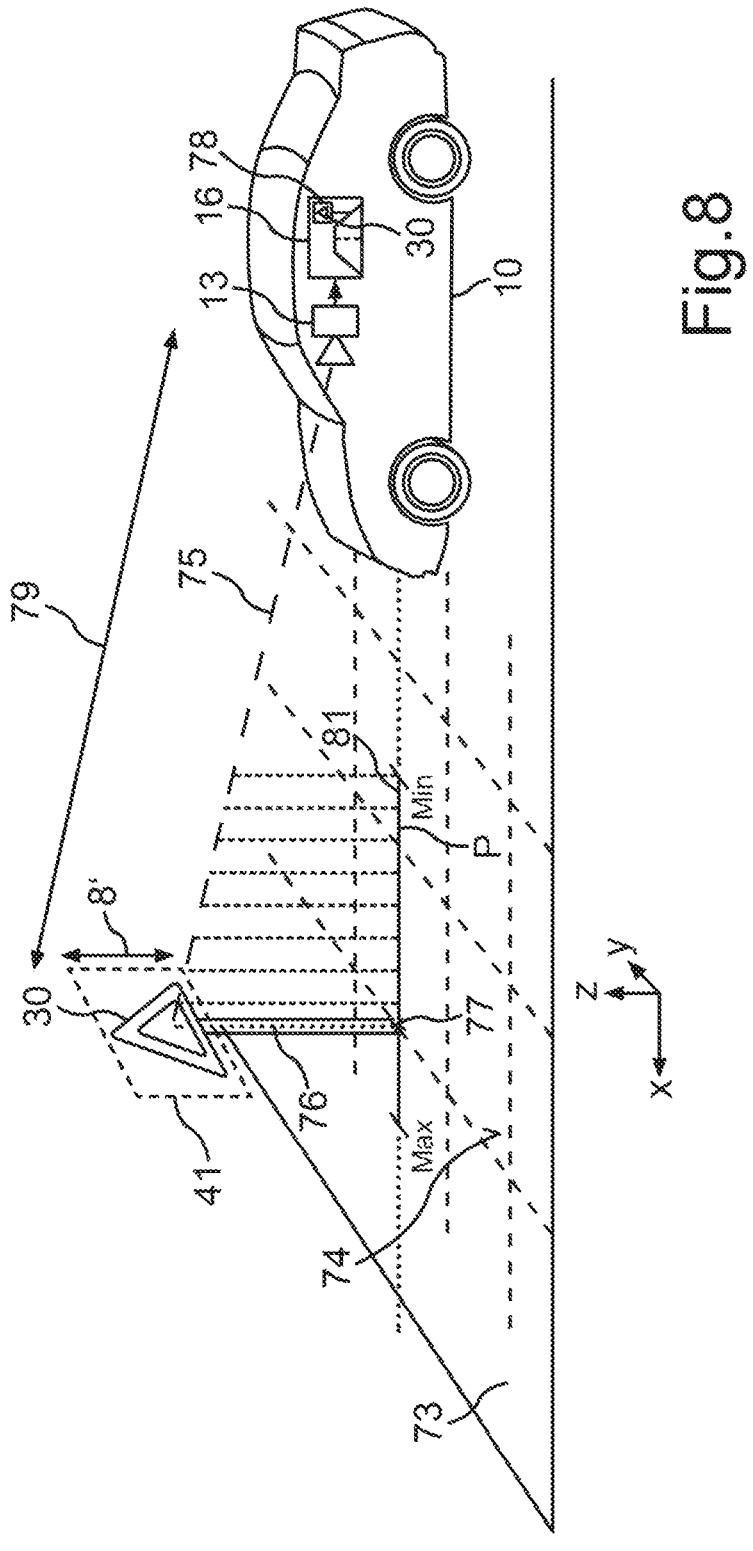
FIG. 8 shows a sketch for the generation of a detection-based landmark descriptor for a landmark arranged above a driving surface.

FIG. 8 illustrates how the relative position P can be ascertained for a landmark 30 having a bounding box 41 situated in the depiction (sensor data 16) above a ground plane 73 of a ground surface or a driving surface 74 on which the motor vehicle 10 is driving. This means that a z coordinate of the vertical is situated above the ground plane 73. The coordinates or a plane equation of the driving surface 74 can be ascertained from the coordinate system of the environment sensor 13 based on the known installation spot thereof at the motor vehicle 10 (installation height of the environment sensor 13 is known).

So as to obtain two-dimensional coordinates x, y of a landmark 30 on the driving surface 74, the relative position P can be ascertained by constructing or computing a line of sight 75 between the environment sensor 13 and the landmark 30, and thus a ground position 77 on the driving surface 74 is constructed by dropping a perpendicular 76 or vertically projecting the line of sight 75.

In the depiction (sensor data 16), a depiction size 78 of the landmark 30 can be ascertained and from this, it is possible to estimate the distance 79 that the landmark 30 must have with respect to the environment sensor 13. If the specific landmark size 80 is unknown, it is possible to specify from the depiction size 78, by means of back-projection, a minimum value Min and a maximum value Max of a distance 79 of the landmark 30 by predefining a minimum value and a maximum value for the landmark size 80. The relative position P then results as a position interval 81 of possible relative positions along the projected line of sight from the maximum value Min to the maximum value Max. The relative position P is thus not defined as a point on the driving surface 74, but as a line segment. This then has to be compared to the point coordinate from the map data, which can be achieved by means of the model 63 through appropriate training. The variance or the matrix value var(x) can then accordingly be specified as a function of the length of the position interval 81 so as to signal the uncertainty or the variance in the distance 79 to the observer model 27.

Back-projection can also be applied to landmarks 30 detected on the driving surface 74, and the dropping of the perpendicular 76 can be dispensed with since the landmark is already located on the driving surface. Another option would be, for example, a depth-from-mono system (also known as "monocular depth estimation").

In this way, in particular a deep learning-based method for the camera-based localization of the vehicle relative to an external map is provided. This approach utilizes landmarks or objects, such as traffic signs or roadway markings, which can be extracted from camera images using another, known deep learning method, and compares these to corresponding landmarks or objects from an HD road map.

The comparison takes place image by image, such as by way of a deep learning approach, that is, there is an artificial neural network that computes for each image the pose relative to the external map (Δx, Δy, Δφ) as well as a covariance matrix. This is fed to a Kalman filter as an observer model to obtain a consistent trajectory of the movement path.

The method is based on the comparison of map data to recognition data from the camera. The following sections describe these input data or feature data here in detail:

Map data: The map data may stem from at least one HD map that describes landmarks. These orientation points can have various geometric primitives, such as polylines (for example for curbs or roadway markings) or points (for traffic signs or traffic lights). It is also possible for label data to be assigned as additional information to each orientation point (for example the traffic sign type of a traffic sign or whether a roadway marking is solid or dashed). The maps can be present either in 2D (for example the heights of the orientation points are unknown, and a flat world is assumed) or in 3D. See FIG. 2 for an example.

Recognition data of cameras: The vehicle carries one or more cameras. It can be assumed that these have known intrinsic and extrinsic parameters. Machine learning algorithms may be used, which extract semantic objects from the camera images. These objects could be:

bounding boxes for traffic signs, together with labels of the sign types as semantic label data;

extracted roadway markings, either as polylines in the
image or as a kind of parametric curve (for example, a
clothoid); and other objects that can be represented by bounding boxes
(for example traffic lights, road pictograms).

See FIG. 3 and FIG. 4 for examples of detections.

Collateral data: In addition to the camera data, other
additional data include:

GPS data for obtaining a rough initial localization; and
data from a wheel odometry system Similarly to the publication by Engel et al., landmarks can
be extracted from a semantic map (using GPS in order to
extract all landmarks in the environment of the vehicle) as
well as from an environment sensor. In Engel, however,
these landmarks are treated as punctiform objects at the
ground plane with their x and y coordinates and are run
through a multilayer perceptron in order to calculate a
higher-dimensional representation. These representations
are superimposed for all landmarks, and a visual descriptor
for the scene is generated by way of a max pooling layer.
Another network computes the position of the vehicle from
the visual descriptor of the map and the local recognitions
(see FIG. 5 and FIG. 6).

This system forms the basis. In contrast to Engel, it is
adapted to a situation in which only monocular depictions
from one camera or multiple cameras, serving as the envi-
ronment sensor, are available, and thus no depth information
is available for the extracted objects or landmarks. Cases
that are also to be treated include those in which a pose
cannot be precisely derived due to a small number of
orientation points, that is, for example, a precise estimation
in the vehicle longitudinal direction is not unambiguous.

The following aspects are introduced into the system as
solutions:

This situation here differs from the original method since
there are no 3D measurements that would make it
possible to compute coordinates at the ground plane for
every landmark. This would require 3D sensors, such
as LIDAR. As a result, the method is modified so as to
also work in situations in which only the camera is
used.

While Engel's system utilizes only the geometry of the
landmarks (2D point coordinates), this approach uti-
lizes semantic properties and image descriptors for
making the method more reliable.

The approach has the system process landmarks with
different geometric primitives (such as polylines, posi-
tion intervals), in contrast to the purely punctiformly
displayed landmarks.

To ensure that this method can be reliably estimated with
a time progression in a Kalman filter, the explicit
learning of a covariance matrix for the localization
result is provided.

The base processing pipeline: The fundamental pipeline
corresponds to FIG. 5 and FIG. 6:

The input point lists contain more than just 2D coordi-
nates, resulting not in a x2, but an xD block or
landmark descriptor, D being the feature dimension
(see next section). An encoder computes a landmark
descriptor.

Multiple point lists or lists of landmark descriptors are
input both for maps and for recognitions/detections,
one for each type of landmark. Each of these lists runs
through a max pooling layer, and the resulting one-
dimensional vectors are concatenated to obtain a visual
descriptor for multiple landmark types.

The final network, serving as the model 63 of machine
learning, not only computes the position x, y of the
vehicle, but also a covariance matrix or the covariance
values.

Processing or preprocessing of the input data: So as to
obtain a D-dimensional input vector or landmark descriptor,
with D being dependent on the type of the landmark, the
following procedure can be employed. The approach pro-
vides a detailed description of the input vector for traffic
signs here. This vector is modified corresponding to the
geometry and the semantic additional information for other
types of landmarks. For traffic signs, there are image coor-
dinates (u,v) in the image from the feature detector (object
recognition), as well as semantic label data. Coding of the
geometry: The position of the sign above the ground plane
is not known since the distance of the object is unknown.
The number of all possible positions on the ground plane
would thus be the intersection of the plane spanned by the
beam of sight of the recognition and the direction of the
gravity vector (upward direction) with the ground plane (see
FIG. 8). This would result in an infinite line on the ground
plane. However, certain prior knowledge about the distance
of the sign is available. This could be derived from the size
of the bounding box in the image, together with the prior
knowledge about the typical dimensions of traffic signs.
Another option would be a depth-from-mono system or a
priori information about the maximum detection range of
objects. This means there is no infinite line on the ground
plane, but a line segment, and the geometry of the object is
coded by the starting and end points of the segments, that is,
with 4 coordinates. This only applies to the recognitions. For
the map, the exact 2D position of the traffic signs is known,
so that there will only be 2 coordinates for the landmarks.

Encoding of the semantic label: Both the detector results
and the orientation points from the map are provided with
semantic designations that code the type of the traffic sign
(for example, stop sign, yield sign, and the like). In general,
the detector and the map use differing taxonomies having
differing granularities for the types of signs (for example, the
detector could only have the class DET_SPEED_LIMIT,
while the map has the classes MAP_SPEED_LIMIT_50,
MAP_SPEED_LIMIT_30, MAP_SPEED_LIMIT_80 and
so forth). No attempt is made to harmonize these designa-
tions (which is a manual process prone to errors), but instead
the network is supposed to learn the association between
map designations and detector designations. For this, the
semantic designations are added as an additional element to
the feature vector.

Encoding of image information: Further information from
the image which is not contained in the position and the
semantic label may possibly be used. This may be the
orientation of the sign or fine-grained semantics not con-
tained in the semantic class. To utilize this information, a
visual descriptor is computed for each image field within the
bounding box by an encoder network. This descriptor is
added to the visual feature vector.

Encoding of collateral information: For the maps, addi-
tional information may be present for each sign (such as the
orientation, the color, and so forth). This information is
simply encoded as an array of numbers, and the feature
vector of the landmark is concatenated therewith. The net-
work learns the relevance of the respective data.

A landmark descriptor for line-shaped landmarks (for
example a roadway marking) thus may be as follows:

Each segment of a polyline is coded as a separate land-
mark.

Since it is known that roadway markings (in contrast to traffic signs) are situated on the ground, it is possible to directly derive a 2D position on the ground plane from the camera image using the known camera extrinsics. The geometry portion is thus made up of the two end points of the roadway marking on the ground plane.

Additional semantic labels describing the appearance of the segments (for example solid vs cashed) are concatenated. Again, the network is intended to learn the match of the semantic designations between the map and the detector.

"Learning" a covariance: The data are fed to a Kalman filter in order to obtain a consistent trajectory across multiple frames. The final pose estimation network (model 63) is expanded by an estimation for the six different elements of the 3×3 covariance matrix. The negative log likelihood may be used as an additional loss function.

The loss function is thus made up of an L2 loss for the translation and the rotation, together with the log likelihood loss for the covariance.

Training method for the artificial neural networks $MLP_{off set}$ and $MLP_{meas}$: The system requires video data of vehicles having known positions relative to the map. These training data could stem from a combined differential GPS (DGPS)/a measuring system comprising inertial sensors or from successful runs with a previous localization method. The network can be trained using these ground truth position data. For the training, in contrast, no ground truth labels are necessary for correspondences of map landmarks and detection landmarks. These associations result automatically from the training. Ground truth position data (which may include position data) are sufficient.

This yields a method for the self-localization of vehicles based on landmarks relative to a predefined map. This method uses a deep learning procedure for regressing the position of the vehicle, together with a covariance matrix, into the system of the map. This method is based on an earlier deep learning-based localization method by Engel, but expands the same so as to render it suitable for a sensor system without 3D sensors and to utilize additional information for the matching.

The idea is that it is useful to use an extended Kalman filter (EKF) (such as from Extended Kalman filter—Wikipedia), that is, including an internal estimation of the covariance. The covariance R of the measurements appears in the EKF equations and comes from the neural network. The covariance from the network is thus that of a measurement from an individual image and is utilized to update, in the EKF, the covariance of the localization from the observation of the entire trajectory. The filter thus continues to estimate the covariance, but uses the covariance from the network to do so.

Overall, the examples show how deep learning can be used for a map-based self-localization of a motor vehicle.

German patent application no. 10 2022 102567.5, filed Feb. 3, 2022, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for localizing a motor vehicle in an environment during a driving operation, the method comprising:

by a processor circuit in repeated estimation cycles:

receiving sensor data of landmarks of the environment from an environment sensor, and ascertaining position data of a respective estimated position that the motor vehicle has with respect to the environment from feature data, which are formed of map data of a map region of the environment and of the sensor data, using an estimation module, wherein:

a movement path of the driving operation is estimated from the position data of multiple of the repeated estimation cycles using a statistical observer model, the statistical observer model, during formation of the movement path, models measurement noise contained in the position data as a covariance matrix of position coordinates of the position data, process matrix values of the covariance matrix are ascertained by the estimation module as a function of the sensor data and the map data and provided to the statistical observer model, at least one preprocessing module is connected upstream from the estimation module, which generates, as feature data, detection-based landmark descriptors of the landmarks formed of the sensor data and map-based landmark descriptors of the landmarks formed of the map data, and the at least one preprocessing module provides position data of a relative position of the landmarks with respect to the motor vehicle to the detection-based landmark descriptors, for each of the landmarks, the relative position of the landmark arranged above a driving surface being ascertained by dropping a perpendicular on the driving surface for a virtual line of sight connecting this landmark and the environment sensor and thereby constructing a line of possible relative positions on the driving surface, and the method includes selecting, from the line, a position interval and/or multiple relative positions using a plausibility criterion, which identifies those relative positions which yield a depiction size of the landmark in the environment sensor that corresponds to the depiction size observed by the sensor data.

2. The method according to claim 1, wherein the statistical observer model comprises a Luenberger observer or a Kalman filter and is adapted so as to set the covariance matrix thereof of the measurement noise using the process matrix values from the estimation module.

3. The method according to claim 1, wherein the sensor data include a two-dimensional depiction of the environment and, using object recognition, recognition data of objects recognized in the environment by way of the object recognition are ascertained from the sensor data, the recognition data comprising semantic data of object designations of the objects and/or geometric data of a position and/or shape of the objects.

4. The method according to claim 1, wherein the map data of the map region are selected from a digital environment map of the environment in a database using initial position data of at least one localization unit.

5. The method according to claim 1, wherein the environment sensor is a monocular camera.

6. The method according to claim 1, wherein the at least one preprocessing module for each landmark of the landmarks integrates semantic label data of a designation describing the landmark in terms of content into the detection-based landmark descriptors and the map-based landmark descriptors.

7. The method according to claim 1, wherein the preprocessing module integrates pixel data or filtered pixel data of image sections of the landmarks into the detection-based landmark descriptors.

8. The method according to claim 1, wherein the preprocessing module for each landmark of the landmarks integrates collateral semantic data of predetermined additional information related to the landmark into the detection-based landmark descriptors and/or into the map-based landmark descriptors.

9. The method according to claim 1, wherein the estimation module comprises a model of machine learning, which is trained so as to compare the detection-based landmark descriptors to the map-based landmark descriptors for a position-related match and, generates correction coordinates for a maximized match as position data, correction data describing a relative displacement of the landmarks represented by the detection-based landmark descriptors with respect to the map region.

10. The method according to claim 1, wherein at least one predetermined portion of the detection-based landmark descriptors and at least one predetermined portion of the map-based landmark descriptors are processed by a multi-layer perceptron, and thereafter the processed descriptors are summarized by a max pooling layer.

11. A processor circuit for a motor vehicle or for a back-end server configured so as to be couplable to a motor vehicle, wherein the processor circuit is designed to carry out a method for localizing a motor vehicle in an environment during a driving operation, the method comprising:

by a processor circuit in repeated estimation cycles:
receiving sensor data of landmarks of the environment from an environment sensor, and
ascertaining position data of a respective estimated position that the motor vehicle has with respect to the environment from feature data, which are formed of map data of a map region of the environment and of the sensor data, using an estimation module,
wherein:
a movement path of the driving operation is estimated from the position data of multiple of the repeated estimation cycles using a statistical observer model,
the statistical observer model, during formation of the movement path, models measurement noise contained in the position data as a covariance matrix of position coordinates of the position data,
process matrix values of the covariance matrix are ascertained by the estimation module as a function of the sensor data and the map data and provided to the statistical observer model,
at least one preprocessing module is connected upstream from the estimation module, which generates, as feature data, detection-based landmark descriptors of the landmarks formed of the sensor data and map-based landmark descriptors of the landmarks formed of the map data, and
the at least one preprocessing module provides position data of a relative position of the landmarks with respect to the motor vehicle to the detection-based landmark descriptors, for each landmark of the landmarks, the relative position of the landmark arranged above a driving surface being ascertained by dropping a perpendicular on the driving surface for a virtual line of sight connecting this landmark and the environment sensor and thereby constructing a line of possible relative positions on the driving surface, and the method includes selecting, from the line, a position interval and/or multiple relative positions using a plausibility criterion, which identifies those relative positions which yield a depiction size of the landmark in the environment sensor that corresponds to the depiction size observed by the sensor data.

12. A motor vehicle, comprising an environment sensor and a processor circuit, coupled to the environment sensor, according to claim 11, wherein the processor circuit is coupled to a control unit designed for automated vehicle guidance, for transmitting an estimated movement path of a driving operation of the motor vehicle to the control unit.

13. A non-transitory computer-readable memory medium, comprising commands which, when executed by a computer or a computer network, prompt the computer or the computer network to carry out a method for localizing a motor vehicle in an environment during a driving operation, the method comprising:

by a processor circuit in repeated estimation cycles:
receiving sensor data of landmarks of the environment from an environment sensor, and
ascertaining position data of a respective estimated position that the motor vehicle has with respect to the environment from feature data, which are formed of map data of a map region of the environment and of the sensor data, using an estimation module,
wherein:
a movement path of the driving operation is estimated from the position data of multiple of the repeated estimation cycles using a statistical observer model,
the statistical observer model, during formation of the movement path, models measurement noise contained in the position data as a covariance matrix of position coordinates of the position data,
process matrix values of the covariance matrix are ascertained by the estimation module as a function of the sensor data and the map data and provided to the statistical observer model,
at least one preprocessing module is connected upstream from the estimation module, which generates, as feature data, detection-based landmark descriptors of the landmarks formed of the sensor data and map-based landmark descriptors of the landmarks formed of the map data, and
the at least one preprocessing module provides position data of a relative position of the landmarks with respect to the motor vehicle to the detection-based landmark descriptors, for each landmark of the landmarks, the relative position of the landmark arranged above a driving surface being ascertained by dropping a perpendicular on the driving surface for a virtual line of sight connecting this landmark and the environment sensor and thereby constructing a line of possible relative positions on the driving surface, and the method includes selecting, from the line, a position interval and/or multiple relative positions using a plausibility criterion, which identifies those relative positions which yield a depiction size of the landmark in the environment sensor that corresponds to the depiction size observed by the sensor data.

* * * * *